(12) United States Patent
Bookbinder et al.

(10) Patent No.: US 10,274,674 B2
(45) Date of Patent: Apr. 30, 2019

(54) LOW BEND LOSS SINGLE MODE OPTICAL FIBER WITH CHLORINE UPDOPED CLADDING

(71) Applicant: Corning Incorpoated, Corning, NY (US)

(72) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/034,690

(22) Filed: Jul. 13, 2018

(65) Prior Publication Data
US 2018/0335565 A1     Nov. 22, 2018

Related U.S. Application Data

(60) Continuation of application No. 15/708,438, filed on Sep. 19, 2017, now Pat. No. 10,048,438, which is a
(Continued)

(51) Int. Cl.
| | |
|---|---|
| G02B 6/02 | (2006.01) |
| G02B 6/036 | (2006.01) |
| G02B 6/028 | (2006.01) |

(52) U.S. Cl.
CPC ..... *G02B 6/03627* (2013.01); *G02B 6/02004* (2013.01); *G02B 6/02014* (2013.01);
(Continued)

(58) Field of Classification Search
None
See application file for complete search history.

(56) References Cited

U.S. PATENT DOCUMENTS

| | | | | |
|---|---|---|---|---|
| 5,410,567 A | * | 4/1995 | Brundage | ............. C03B 37/029 |
| | | | | 219/635 |
| 6,027,062 A | * | 2/2000 | Bacon | .................. B65H 57/003 |
| | | | | 242/157.1 |

(Continued)

OTHER PUBLICATIONS

International Search Report and Written Opinion of the International Searching Authority; PCT/US2016/051707; dated Dec. 1, 2016; 15 Pages; European Patent Office.

*Primary Examiner* — Jerry Rahll
(74) *Attorney, Agent, or Firm* — Smit Kapadia; Svetlana Z. Short

(57) ABSTRACT

An optical fiber having both low macrobend loss and low microbend loss. The fiber has a central core region, a first (inner) cladding region surrounding the central core region and having an outer radius $r_2 > 16$ microns and relative refractive index $\Delta_2$, and a second (outer) cladding region surrounding the first cladding region having relative refractive index, $\Delta_3$, wherein $\Delta_1 > \Delta_3 > \Delta_2$. The difference between $\Delta_3$ and $\Delta_2$ is greater than 0.12 percent. The fiber exhibits a 22 m cable cutoff less than or equal to 1260 nm, and $r_1/r_2$ is greater or equal to 0.24 and bend loss at 1550 nm for a 15 mm diameter mandrel of less than 0.5 dB/turn.

34 Claims, 6 Drawing Sheets

Related U.S. Application Data division of application No. 15/264,750, filed on Sep. 14, 2016, now Pat. No. 9,798,079.

(60) Provisional application No. 62/218,820, filed on Sep. 15, 2015.

(52) U.S. Cl.
CPC ....... *G02B 6/0281* (2013.01); *G02B 6/02395* (2013.01); *G02B 6/03644* (2013.01); *G02B 6/02009* (2013.01)

(56) References Cited

U.S. PATENT DOCUMENTS

| | | | | |
|---|---|---|---|---|
| 7,565,820 B2* | 7/2009 | Foster | ............... | C03B 37/02718 65/384 |
| 7,715,675 B2* | 5/2010 | Fabian | ................ | C03C 25/1065 385/100 |
| 7,832,675 B2* | 11/2010 | Bumgarner | ............ | B65H 54/88 242/157.1 |
| 8,891,925 B2* | 11/2014 | Bickham | ............ | G02B 6/02395 385/127 |
| 2011/0211796 A1* | 9/2011 | Bookbinder | ....... | G02B 6/03627 385/126 |
| 2014/0301708 A1* | 10/2014 | Mishra | ..................... | G02B 6/02 385/126 |
| 2014/0328566 A1* | 11/2014 | Bickham | ............ | G02B 6/02395 385/128 |

* cited by examiner

LOW BEND LOSS SINGLE MODE OPTICAL FIBER WITH CHLORINE UPDOPED CLADDING

This is a continuation application of U.S. application Ser. No. 15/708,438 filed on Sep. 19, 2017, which claims the benefit of priority to U.S. application Ser. No. 15/264,750 filed on Sep. 14, 2016, and to U.S. Provisional Application Ser. No. 62/218,820 filed on Sep. 15, 2015, the contents of each are relied upon and incorporated herein by reference in its entirety, and the benefit of priority under 35 U.S.C. § 120 is hereby claimed.

FIELD

The present invention relates to optical fibers having low bend losses.

TECHNICAL BACKGROUND

There is a need for low bend loss optical fibers, particularly for optical fibers utilized in so-called "access" and fiber to the premises (Ft.) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiport located in cabinets that connect feeder and distribution cables, and jumpers in Network Access Points between distribution and drop cables. It has been difficult in some optical fiber designs to achieve both low bend loss and low cable cutoff wavelength at the same time.

SUMMARY

Disclosed herein are optical waveguide fibers comprising: (i) a central core region having outer radius $r_1$ and relative refractive index $\Delta_1$; and (ii) a cladding surrounding the central core region and comprising: (a) a first cladding region having an outer radius $r_2 > 10$ microns and relative refractive index $\Delta_2$, and (b) a second cladding region surrounding the first cladding region and having relative refractive index $\Delta_3$ and an outer radius $r_3$, wherein the second cladding region comprises at least 1.2 wt % chlorine (Cl), and wherein $\Delta_1 > \Delta_3 > \Delta_2$, and the difference between $\Delta_3$ and $\Delta_2$ is greater than 0.12 percent, and $\Delta_3$ is greater 0.12 (for example, greater than 1.25%); and the fiber exhibits a mode field diameter MFD greater than 9 μm at a 1310 nm wavelength and bend loss at 1550 nm for a 15 mm diameter mandrel of less than 0.5 dB/turn. In some embodiments $r_1/r_2$ is greater than or equal to 0.24. In some embodiments $r_1/r_2$ is greater than 0.25, more preferably greater than 0.3, for example $0.45 > r_1/r_2 > 0.25$. In some embodiments $0.4 \geq r_1/r_2 \geq 0.26$. According to exemplary embodiments disclosed herein the first, first cladding region is comprised of essentially pure silica ($SiO_2$). In some embodiments the difference between $\Delta_3$ and $\Delta_2$ is greater than 0.12 percent, and in some embodiments greater than 0.12 percent (e.g. $>0.13\%$), for example 0.12 to 0.25 percent, or 0.12 to 0.2 percent. In at least some embodiments the fiber exhibits a MAC number $>6.5$, and in some embodiments greater than 7.5. The exemplary fibers disclosed herein preferably exhibit a 22 m cable cutoff less than or equal to 1260 nm, for example 1175 nm to 1255 nm.

According to at least some exemplary embodiments the central core region of the fiber substantially exhibits an alpha profile with an alpha less than 10, for example less than 6 and in some embodiments less than 4.

The fiber designs disclosed herein result in fibers having optical properties that are G.652 compliant, MFD between 9 and 9.5 microns at 1310 nm, typically between 9.0 and 9.4 microns at 1310 nm, zero dispersion wavelength, λ0, of 1300 nm $\leq \lambda 0 \leq$ 1324 nm, cable cutoff less than or equal to 1260 nm, and attenuation at 1550 nm $\leq 0.189$ dB/km. In at least some embodiments attenuation is $\leq 0.185$ dB/km, or even $\leq 0.183$ dB/km at 1550 nm.

According to the exemplary embodiments described herein the cladding includes a low index cladding region surrounding the core (also referred to herein as the first cladding region or the inner cladding region). Fibers having this low index cladding region have reduced microbending losses. The low index cladding region may have the absolute volume of between about 30 and 90% $\Delta$ microns$^2$, for example between 40 and 75% $\Delta$ microns$^2$. The low index cladding region may be formed essentially of pure silica, and is depressed relative to the second cladding region which is updoped with at least 1.2 wt % chlorine.

Preferably, the fibers disclosed herein are capable of exhibiting a wire mesh covered drum microbend loss (i.e., an increase in attenuation from the unbent state) at 1550 nm which is less than or equal to 0.07 dB/km, more preferably less than or equal to 0.05 dB/km.

Fibers having a trench region (depressed index region) in the cladding have improved (reduced) microbending losses. The trench region in the cladding of the fibers disclosed herein may be formed either by down doping the trench region (e.g. by fluorine (F) doping or by doping with non-periodic voids) or by updoping the outer cladding region. In other embodiments, the fibers may include both a trench region and an outer cladding region which is updoped with respect to silica ($SiO_2$), i.e. a cladding region which includes an index increasing dopant such as germania ($GeO_2$) or chlorine (Cl) in sufficient amounts to appreciably raise the index of silica.

The embodiments of fibers disclosed herein preferably exhibit a 10 mm diameter macro bend loss at 1550 nm which is not more than 1 dB/turn (e.g., 0.1 to 0.9 dB/turn). The embodiments of fibers disclosed herein preferably exhibit a 15 mm diameter macro bend loss at 1550 nm which is not more than 0.5 dB/turn (e.g., 0.05 to 0.45 dB/turn). Additionally, at least some of the embodiments of fibers disclosed herein exhibit a 20 mm diameter bend loss at 1550 nm which is not more than 0.2 dB/turn (for example, 0.01 dB/turn to 0.1 dB/turn). At the same time, these fibers are capable of providing an attenuation at 1550 nm which is less than or equal to 0.19 dB/km, more preferably less than 0.186 dB/km, and most preferably less than 0.184 dB/km, as well as an attenuation at 1310 nm which is less than or equal to 0.34 dB/km, more preferably less than 0.32 dB/km. Preferably, according to some embodiments, the 30 mm diameter bend loss at 1550 nm is not more than 0.02 dB/turn (e.g., 0.002 to 0.015 dB/turn). In some embodiments, the 20 mm diameter bend loss at 1550 nm is not more than 0.04 dB/turn. In other preferred embodiments, the 20 mm diameter bend loss at 1550 nm is not more than 0.038 dB/turn. In some embodiments, the 30 mm diameter bend loss at 1550 nm is not more than 0.015 dB/turn.

Some fiber embodiments utilize a primary and a secondary coating, wherein the Young's modulus of the primary coating is less than 5 MPa, more preferably less than 1 MPa, and the Young's modulus of the secondary coating is greater than 500 MPa, more preferably greater than 900 MPa, and even more preferably greater than 1100 MPa.

In some embodiments, the refractive index profile of the optical fiber further provides a zero dispersion wavelength of less than 1325 nm. In some embodiments, the refractive index profile further provides a zero dispersion wavelength of between 1300 and 1325 nm.

Preferably, the refractive index profile further provides a cabled cutoff of less than or equal to 1260 nm, more preferably between 1000 nm and 1260 nm.

In some embodiments, the refractive index profile of the optical fiber further provides a mode field diameter at 1310 nm between 9 and 9.5 microns.

As used herein, MAC number means mode field diameter at 1310 (nm) divided by 22 m cable cutoff wavelength (nm). In some embodiments, the refractive index profile further provides a MAC number greater than 6.5. In some preferred embodiments, the refractive index profile further provides a MAC number of greater than 7.2, for example greater than 7.2 or greater than 7.5, or is at least 8, e.g., 7.2 to 7.8.

According to at least some exemplary embodiments the fiber exhibits a wire mesh covered drum microbend loss at 1550 nm which is less than or equal to 0.07 dB/km. According to at least some exemplary embodiments the fiber exhibits an attenuation at 1550 nm which is less than or equal to 0.18 dB/km. The exemplary fibers disclosed herein are capable of exhibiting a wire mesh covered drum microbend loss (i.e., an increase in attenuation from the unbent state) at 1550 nm (WMCD at 1550 nm) which is less than or equal to 0.07 dB/km and in some embodiments less than or equal to 0.05 dB/km, such as for example 0.005 to 0.05 dB/km. The exemplary fibers disclosed herein are capable of exhibiting a basketweave microbend loss at −60° C. (i.e., an increase in attenuation from the unbent state) at 1550 nm which is less than or equal to 0.05 dB/km, in some embodiments less than or equal to 0.02 dB/km, and in some embodiments less than or equal to 0.01 dB/km such as for example 0.001 to 0.01 dB/km.

Reference will now be made in detail to the present preferred embodiments, examples of which are illustrated in the accompanying drawings.

DETAILED DESCRIPTION OF THE PREFERRED EMBODIMENT

Figure 1:
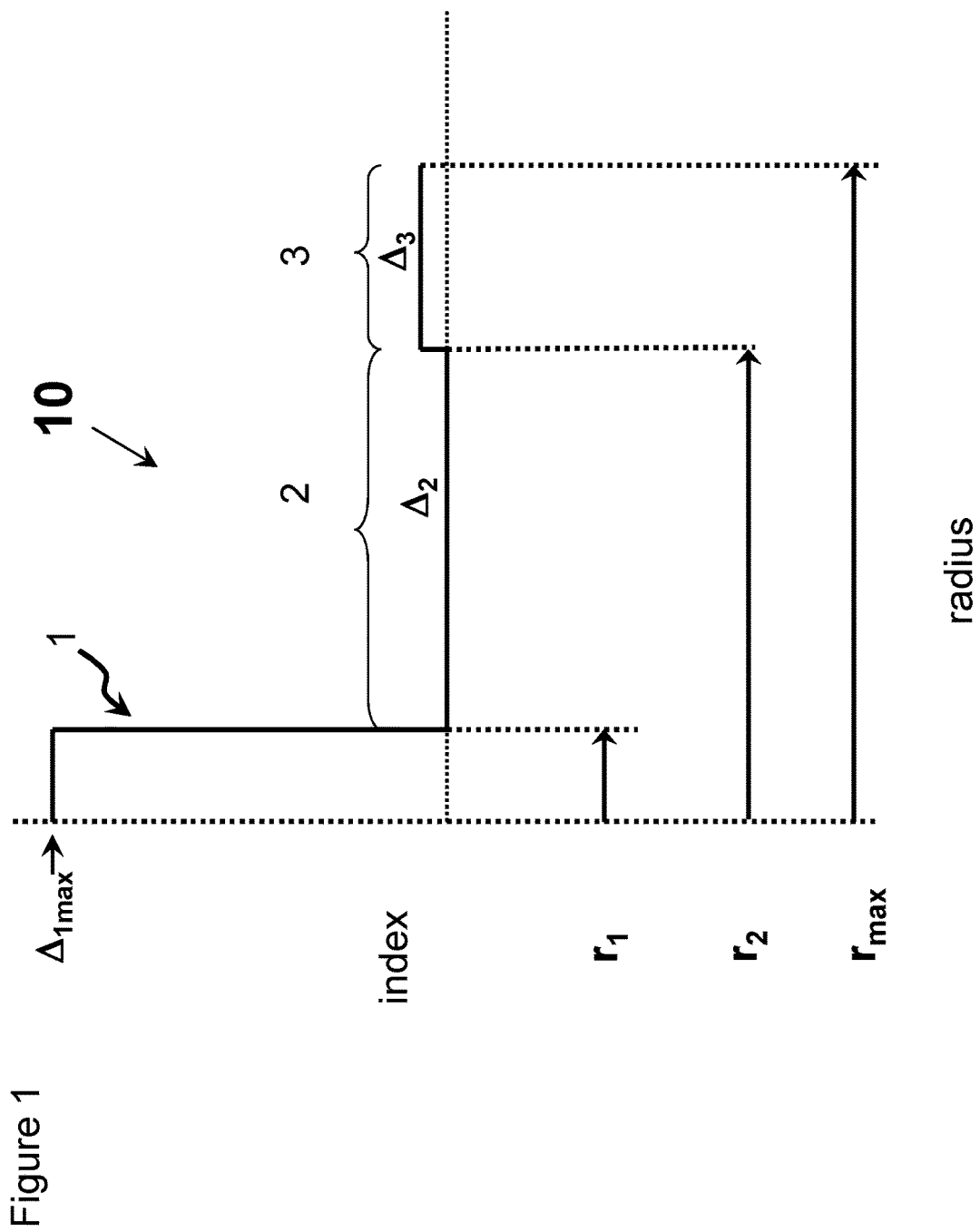
FIG. 1 illustrates a refractive index profile corresponding to an embodiment of an optical waveguide fiber disclosed herein.
Figure 2:
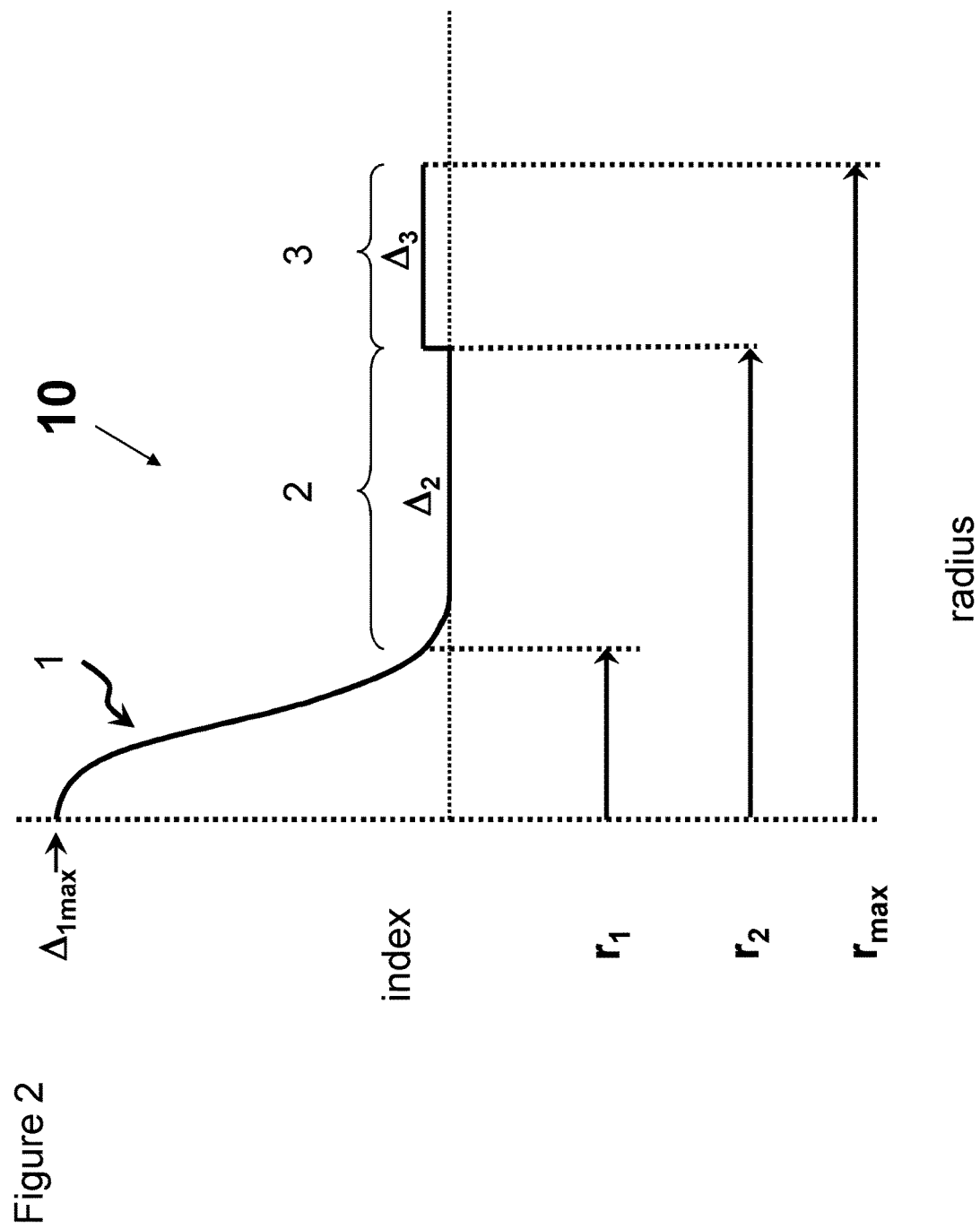
FIG. 2 illustrates a refractive index profile of another embodiment of the optical waveguide fiber.

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and the radial position within the waveguide fiber. The radius for each segment of the refractive index profile is given by the abbreviations $r_1$, $r_2$, $r_3$, $r_4$, etc. and lower and upper case are used interchangeably herein (e.g., $r_1$ is equivalent to $R_1$).

The term "relative refractive index percent" (also referred to herein as "relative refractive index", and "refractive index delta") is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. The terms: delta, $\Delta$, $\Delta$ %, % $\Delta$, delta %, % delta and percent delta may be used interchangeability herein. That is, as used herein, relative refractive index percent (or relative refractive index, or refractive index delta) of a given fiber region is measured relative to undoped silica. In cases where the refractive index of a region is less than the average refractive index of undoped silica, the relative index percent is negative and may be referred to as having a depressed region or depressed index. In cases where the refractive index of a region is greater than the average refractive index of undoped silica, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r \, dr)^2 / (\int f^4 r \, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_1 \leq r \leq r_f$, where $\Delta$ is defined above, $r_1$ is the initial point of the α-profile, $r_f$ is the final point of the α-profile, and α is an exponent which is a real number.

The mode field diameter (MFD) is measured using the Peterman II method wherein, $2w = MFD$, and $w^2 = (2\int f^2 r \, dr / \int [df/dr]^2 r \, dr)$, the integral limits being 0 to $\infty$.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

Another type of bend test is the basketweave microbend loss test. In the basketweave microbend loss test, the fibers are wound at high tension on a glass spool and exposed to a temperature cycle. The testing apparatus comprises of a fixed diameter silica drum. The drum surface is smooth. In this test, the drum diameter is 110 mm. The fiber is wound onto the glass drum with a winding tension of 70 grams, and a pitch of 2 mm (distance between adjacent wraps of fiber). Multiple layers of fiber are wrapped with this tension and pitch. The pitch angles are reversed with each layer wound. The crossover of the tensioned fibers from the adjacent layers creates the microbend mechanism. A fiber length of 2.5 km is used. The initial fiber attenuation measurement is performed at about 23°, at about 45% RH (relative humidity) with the fiber deployed in the basketweave configuration with 70 grams of tension. Initial attenuation loss measurements are made at wavelengths of 1310 nm, 1550 nm, and 1625 nm. An OTDR (optical time domain reflectometer) is used to acquire the attenuation loss data.

After the initial attenuation loss measurement at 23° C., the fiber is subjected to thermal cycling. In the thermal cycling, the fiber is first cooled from 23° C. to −60° C. at a rate of 1° C./min. The fiber is maintained at −60° C. for 20 hours and then heated at a rate of 1° C./min back to 23° C. The fiber is maintained at 23° C. for 2 hours, then heated to 70° C. at a rate of 1° C./min and maintained at 70° C. for 20 hours. The fiber is then cooled to 23° C. at a rate of 1° C./min and maintained at 23° C. for two hours. The fiber is then subjected to a second thermal cycle, which was identical to the first thermal cycle—i.e., it is cooled from 23° C. to −60° C., then heated back to 23° C., maintained at that temperature for 2 hours and then heated from 23° C. to 70° C., after which it is cooled back to 23° C. Finally, after maintaining the fiber at a temperature of 23° C. for two hours, after the second cycle, the fiber is once again cooled to −60° C. at a rate of 1° C./min, held at −60° C. for 20 hours, and then further cooled at a rate of 1° C./min to −60° C. The fiber is held at −60° C. for 20 hours, then heated at a rate of 1° C./min back to 23° C. and held at 23° C. for 2 hours. The thermal cycling is concluded at this point.

During the thermal cycling of the fiber, the attenuation loss of the fiber is measured continuously. The maximum attenuation loss over the two thermal cycles down to −60° C. is determined, and the difference between this maximum attenuation loss and the initial attenuation loss at 23° C. is reported herein, as the basketweave microbend loss of the fiber over the temperature range from −60° C. to 70° C. In the thermal cycle down to −60° C., the difference between the attenuation loss measured at −60° C. and the initial attenuation loss at 23° C. is reported herein as the basketweave microbend loss of the fiber over the temperature range from −60° C. to 23° C.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

Optical fibers (10) disclosed herein are capable of exhibiting an effective area Aeff at 1550 nm which is greater than about 55 microns$^2$, preferably between 55 and 95 microns$^2$, even more preferably between about 65 and 85 microns$^2$. In some preferred embodiments, the effective area at 1550 nm is between about 75 and 90 micron$^2$.

Six exemplary embodiments of optical fiber (10) are shown in FIGS. 1-6 respectively. As shown in these figures, optical fiber (10) includes a central glass core region (1) comprising maximum relative refractive index (relative refractive index percent) $\Delta_1$ and an outer radius $r_1$. The central core region (1) is surrounded by the cladding region (2'). The cladding (2') includes a first cladding region (2) and a second cladding region (3). The first cladding region (2) (also referred herein as region (2), or the inner cladding region (2)) has a relative refractive index $\Delta_2$ and an outer radius $r_2$, wherein 25 microns>$r_2$>16 microns. The first cladding region (2) has an index of refraction that depressed relative to, or is lower than the index of refraction of the second cladding region (3), such that $\Delta_3$>$\Delta_2$. According to some embodiments, $r_1/r_2$ is larger than 0.25.

FIGS. 1-6 illustrate that the second cladding region (3) surrounds first cladding region (2) and comprises a relative refractive index $\Delta_3$. In exemplary embodiments described herein, $\Delta_1$>$\Delta_3$>$\Delta_2$. In the embodiments illustrated in FIGS. 1-6, the central core region (1) and cladding regions (2) and (3) are immediately adjacent one another. However, this is not required, and alternatively additional core or cladding regions may be employed. Furthermore, for example, another outer cladding region, such as a third cladding region (4), may surround the annular second cladding region (3). This is shown, for example, in FIG. 6. The third cladding region (4), comprises a lower relative refractive index $\Delta_4$ than the second cladding region (3). I.e., $\Delta_4$<$\Delta_3$, and in some embodiments $\Delta_4$=$\Delta_2$. In some embodiments $\Delta_2$<$\Delta_4$<$\Delta_3$.

Central core region (1) comprises an outer radius $r_1$ which is defined as where a tangent line drawn through maximum slope of the refractive index of central core region 1 crosses the zero delta line (zero relative refractive index line). Core region (1) preferably exhibits a relative refractive index, $\Delta_1$, between about 0.4 and 0.7, and in some embodiments between about 0.42 and 0.6 (relative to pure silica). In some embodiments, $\Delta_1$ is preferably between 0.44 and 0.55. Core radius $r_1$ is preferably between 3 and 10 microns, more preferably between about 4.0 to 7.0 microns, for example 6.0 to 7.0 microns. Central core region (1) may comprise a single segment, step index profile, as shown for example in FIG. 1. In some embodiments, central core region (1) exhibits an alpha greater than 0.5 and less than 10, and in some embodiments less than 7.5, less than 5, or less than 3. In some embodiments, central core region (1) exhibits an alpha greater than 0.5 and less than 10, and in some embodiments less than 7.5, less than 5, or greater than 1 and less than 3, and a relative refractive index percent, $\Delta_1$ between 0.38 and 0.5. In some embodiments, central core region (1) exhibits an alpha greater than 0.5 and less than 10, and in some embodiments less than 7.5, less than 5, or less than 3, and a core region (1) having a relative refractive index percent, $\Delta_1$ between 0.38 to 0.5, and a core radius between about 4 and 7 microns. In some embodiments, central core region (1) substantially exhibits an alpha profile with an alpha greater than or equal to 1.5 and less than or equal to 3.

In some embodiments (see, for example, FIGS. 1 and 2), first cladding region (2) (also referred herein as the inner cladding region (2)) surrounds central core region (1) and comprises inner radius $r_1$ and outer radius $r_2$; $r_1$ being defined as above and $r_2$ being defined as where the refractive index profile curve crosses the zero delta line. In some cases the refractive index in the first cladding region (2) is essentially flat; in some embodiments the refractive index of the inner cladding region (2) increases as radius increases. In still other cases there can be fluctuations as a result of small profile design or process variations. In some embodiments, the first cladding region (2) contains less than 0.02 wt % fluorine. In some embodiments, the first cladding region (2) comprises silica which is substantially undoped with either fluorine or germania, i.e., such that the region is essentially free of fluorine and germania. The second cladding region (2) comprises relative refractive index percent $\Delta_2$ which is calculated using:

$$\Delta_2 = \int_{r1}^{r2} \Delta(r) dr / (r_2 - r_1)$$

The first cladding region (2) preferably exhibits a width between about 3 and 13 microns, more preferably between 4 and 12 microns, even more preferably between about 7 and 9 microns. The outer radius $r_2$ of the inner cladding region (2) may be greater than 16 microns, and in some embodiments may be greater than 20 microns or even greater than 23 microns. In some embodiments, the ratio of the core radius $r_1$ to the inner cladding region (2) radius $r_2$ is preferably greater than 0.24, or greater than 0.3. In some embodiments, $r_1/r_2$ is between 0.24 and 0.55, for example between 0.24 and 4.

The third region of the fiber, or the second cladding region (3), surrounds the lower index inner cladding region (2). The second cladding region comprises relative refractive index $\Delta_3$ which is higher than the relative refractive index $\Delta_2$ of inner cladding region (2), thereby forming a region which is "updoped" with respect to inner cladding region 2, by adding at least 1.2 wt % chlorine. Note, however that the inner cladding region (2) may, in addition, be optionally downdoped relative to pure silica. In some embodiments, there is no fluorine or other down dopants in inner cladding region (2) and the raised index second cladding region (3) (also referred to herein as an outer cladding region (3)), comprises chlorine doped silica, with or without other dopants. This is illustrated, for example, in fiber embodiments of FIGS. 3, and 4. The outer cladding region (3) comprises a higher refractive index than inner the cladding region (2), and preferably comprises relative refractive index percent $\Delta_3$ which is greater than 0.12%, preferably at least 0.13%, for example at least 0.14%, relative to pure silica. Preferably, according to some embodiments (see, for example, FIGS. 1-5) the higher relative refractive index of the outer cladding region (3) (i.e., higher relative to that of the inner cladding region (2)) extends at least to the point where the optical power which would be transmitted through the optical fiber is greater than or equal to 90% of the optical power transmitted. More preferably, the higher relative refractive index of the outer cladding region (3) extends at least to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" outer cladding region (3) extends at least to a radial point of about 30 microns. Consequently, the volume $V_2$ of the inner cladding region (2), is defined herein as being calculated using $\Delta(3-2)(r)rd$. between radius $r_1$ and $r_2$, and thus is:

$$V_2 = 2\int_{r1}^{r2} \Delta_{(3-2)}(r)rdr$$

The volumes $V_2$ are provided in absolute magnitude (i.e., $V_2=|V_2|$). The volume $V_2$ of the first cladding region (2) may be greater than 30% $\Delta$micron$^2$, and in some embodiments may be greater than 40% $\Delta$micron$^2$. According to some embodiments the volume $V_2$ is between about 30 and 90% $\Delta$ microns$^2$, for example between 40 and 75% $\Delta$ microns$^2$.

The volume $V_2$ of the first cladding region (2) is in some embodiments greater than 45% $\Delta$micron$^2$ and in some embodiments greater than 60% $\Delta$micron$^2$. In some embodiments, the volume $V_2$ of the first cladding region (2) is less than 90% $\Delta$micron$^2$ and in some other embodiments the volume $V_2$ of the first cladding region (2) is less than 75% $\Delta$micron$^2$.

In some embodiments, the refractive index $\Delta_3$ of the second cladding region (region (3)) is greater than 0.12 percent, in some embodiments greater than 0.13 percent, in some embodiments at least 0.14 percent, and in some embodiments at least 0.15 percent, for example 0.2 percent, when compared to that of the first cladding region (2). In some embodiments, the second cladding region (3) comprises chlorine (Cl) in an amount greater than 12000 ppm, for example at least 12200 ppm, or at least 12500 ppm, or at least 13000 ppm, or 14000 ppm or more, and in some embodiments preferably greater than 15000 ppm, and, in some embodiments, preferably greater than 20000 ppm (2%) by weight (e.g., 22000 ppm, or 25000 ppm, or there between). For example, in some embodiments, the second cladding region (3) comprises chlorine (Cl) in an amount of 12200 ppm-25000 ppm. Chlorine concentration is described herein in units of parts per million by weight (abbreviated as ppm wt. or ppm, herein).

The central core region (1) preferably has a positive refractive index throughout. The central core region (1) comprises a maximum relative refractive index $\Delta_1$ situated between r=0 and r=7 microns. $\Delta_1$ is greater than 0.4%, for example about 0.4 to 0.7%, or 0.42-0.55%. That is, the central core region (1) comprises a peak relative refractive index that less than or equal to 0.70%.

The inner cladding region (2) preferably has a substantially constant relative refractive index profile, i.e. the difference between the relative refractive index at any two radii within the inner cladding region is less than 0.02%, and in some preferred embodiments less than 0.01%. Thus, the relative refractive index profile of the inner cladding region (2) preferably has a substantially flat shape.

Figure 3:
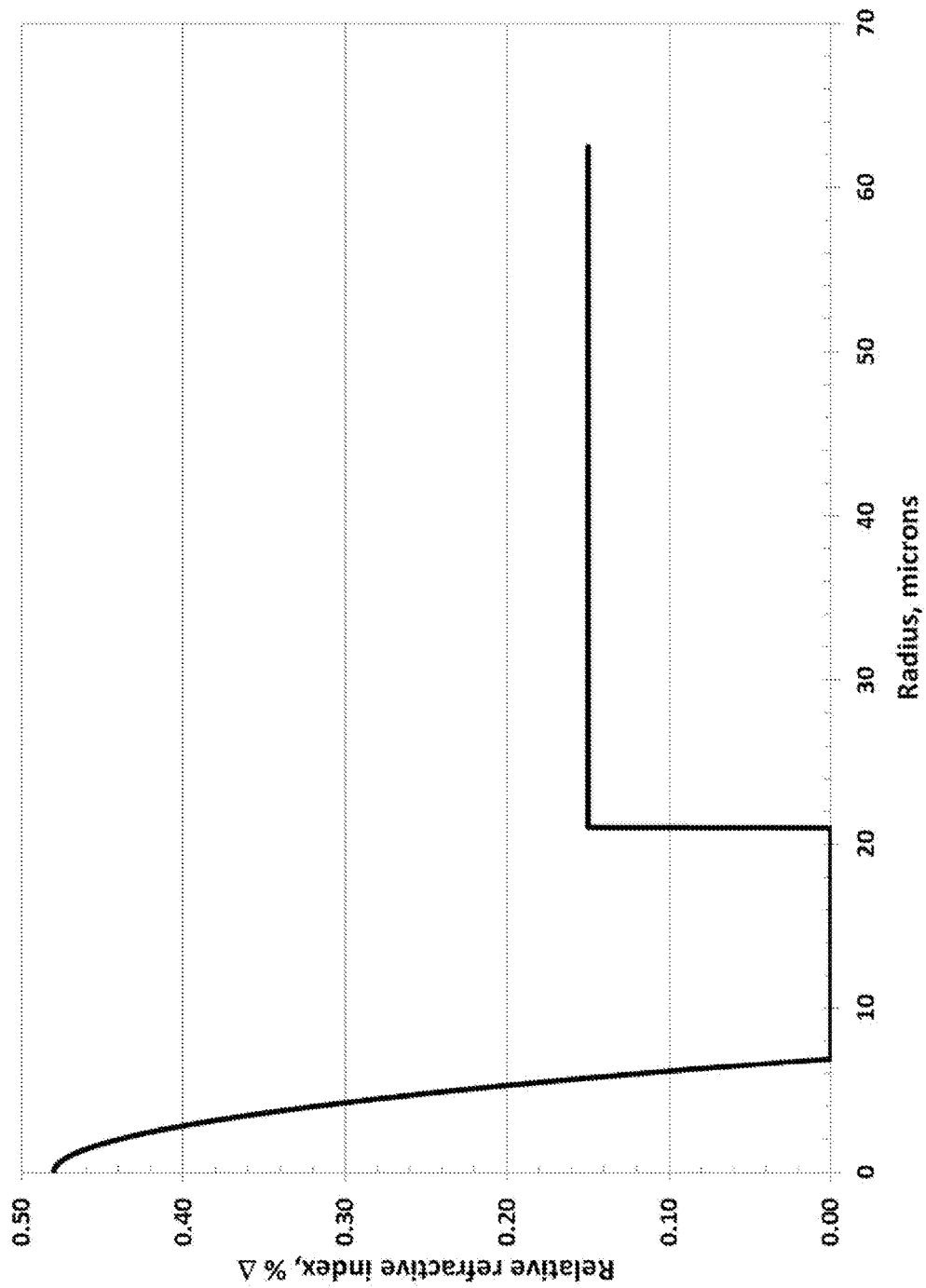
FIGS. 3 and 4 illustrate two exemplary refractive index profiles of fiber embodiments of optical waveguide fibers disclosed herein.
Figure 4:
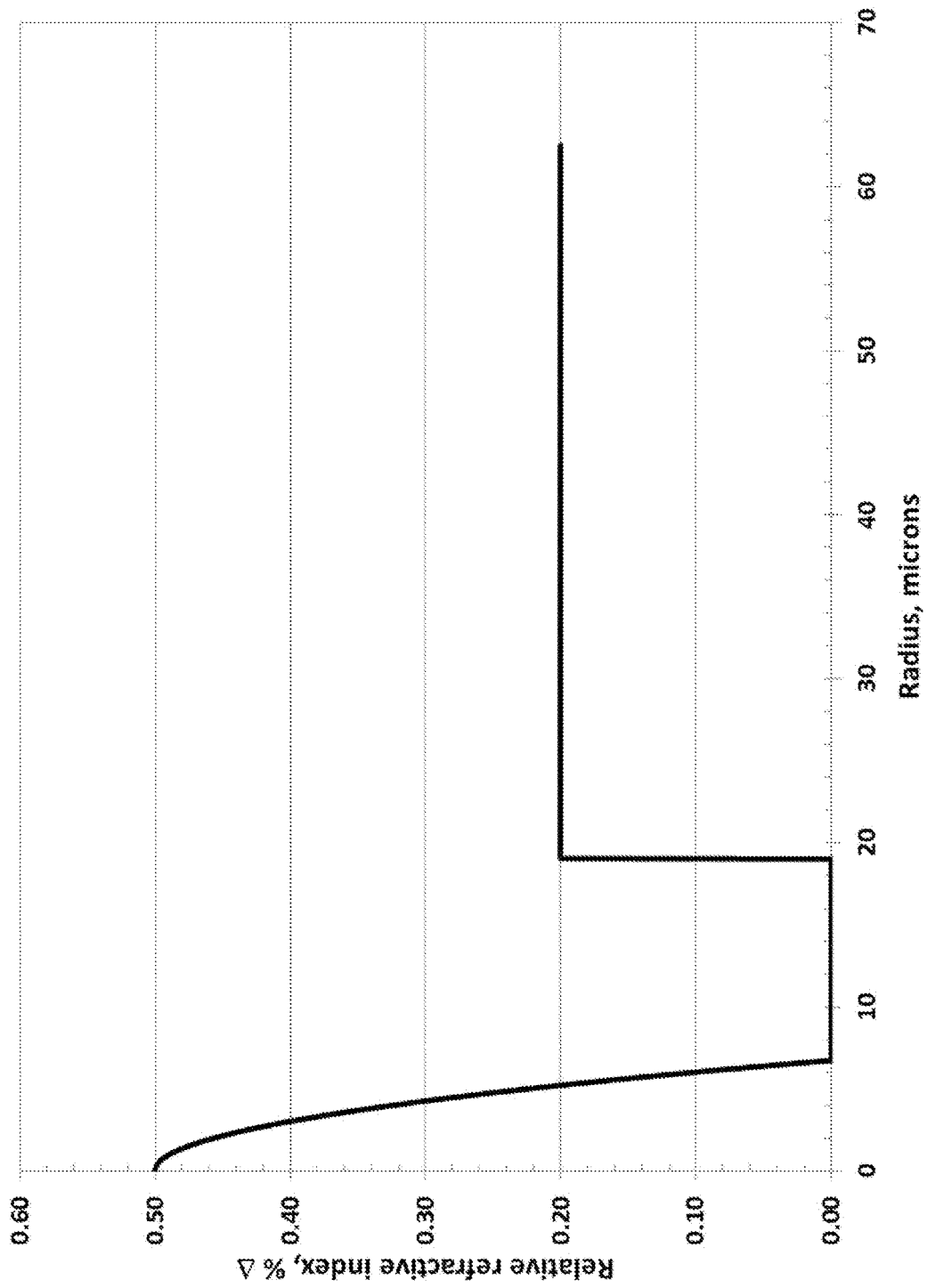
Figure 5:
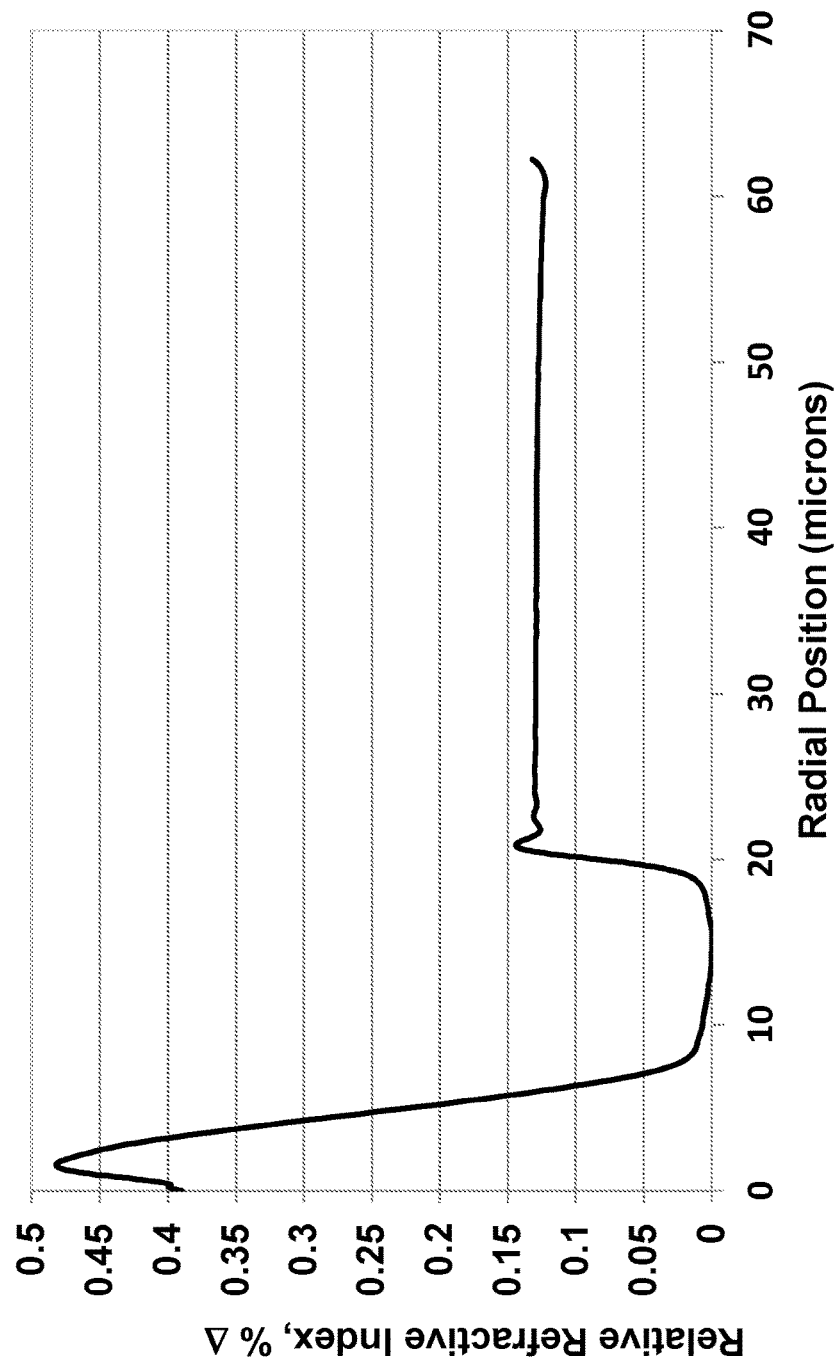
FIG. 5 illustrates an refractive index profile of one exemplary manufactured fiber embodiment, which shows a central core region surrounded by a low refractive index first cladding region and a raised refractive index second cladding region.
Figure 6:
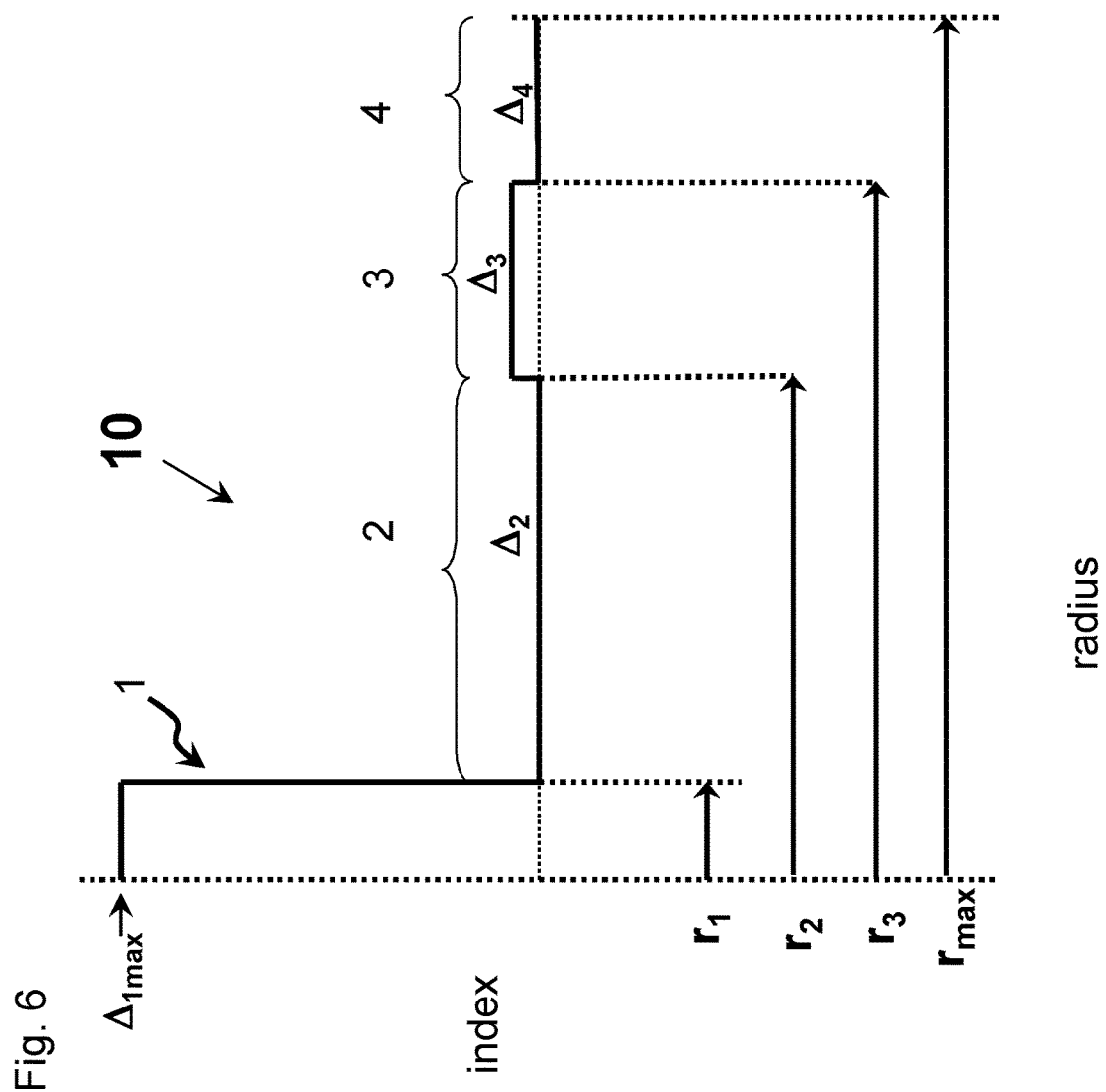
FIG. 6 illustrates an exemplary refractive index profile of yet another exemplary fiber embodiment.

The central core region (1) may be a step index core, or as shown for example in FIGS. 3-5, it may comprise an alpha (a) shape. In some embodiments, $r_1$ is less than 8.0 microns, and more preferably is between 4.0 microns and 7.0 microns. The fibers are capable of exhibiting a bend loss of less than 0.5 dB/turn (at 1550 nm) when wound upon on a 15 mm diameter mandrel for fibers with MAC numbers greater than 6.5 (e.g. 0.05 dB/turn to 0.45 dB/turn at 1550 nm). In some embodiments the fibers exhibit a 20 mm diameter bend loss at 1550 nm of not more than 0.2 dB/turn (for example, 0.01 to 0.1 dB/turn. In some embodiments, the optical fibers disclosed herein have a MAC number of greater than 7, or greater than 7.5, or even greater than 7.6 or 7.7, or in some embodiments greater than or equal to 8, and a zero dispersion wavelength of between 1300 and 1324 nm. For example, in some embodiments, optical fibers (10) have MFD (at 1310 nm) of 9 microns to 9.7 microns, cable cutoff wavelength less than 1.26 μm, MAC numbers between 6.9 and 8.1 (e.g., 7.25≥MAC≥8.1), zero dispersion wavelength between 1300 nm and 1324 nm and bend loss at 1550 nm around a 15 mm diameter mandrel of less than 0.5 dB/turn. In some embodiments, fibers (10) have MFD (at 1310 nm) of 9 microns to 9.7 microns, cable cutoff wavelength less than 1.26 μm, MAC numbers between 6.9 and 8.1 (e.g., 7.25≥MAC≥8.1), zero dispersion wavelength between 1300 nm and 1324 nm and bend loss at 1550 nm around a 15 mm diameter mandrel of less than 0.2 dB/turn. According to some exemplary embodiments the cable cutoff wavelength is between 1.175 μm and 1.26 μm, for example cable cutoff wavelength may between 1.175 μm and 1.255 μm, or may be between 1.2 μm and 1.26 μm.

According to some exemplary embodiments the fiber exhibit:
  MFD at 1310 nm>9 microns;
  Cable Cutoff<1260 nm;
  Zero Dispersion Wavelength<1324 nm;
  Bend loss at 10 mm diameter<1.5 dB/turn;
Bend loss at 15 mm diameter<0.5 dB/turn dB/turn, wherein the Bend loss is macrobend loss and is measured at a 1550 nm wavelength.

According to some exemplary embodiments the fiber exhibits:
  1200<Cable Cutoff<1260 nm;
  1300 nm<Zero Dispersion Wavelength<1324 nm;
  0.7 dB/turn<macrobend loss at 10 mm bend diameter<1.3 dB/turn;
  0.1 dB/turn<macrobend loss at 15 mm bend diameter<0.5 dB/turn;
  0.05 dB/turn<macrobend loss at bend 20 mm diameter<0.20 dB/turn;
0.1<macrobend loss at 30 mm bend diameter<0.2 dB/turn, wherein the macrobend loss is measured at a 1550 nm wavelength.

The exemplary fibers disclosed herein are capable of exhibiting a wire mesh covered drum microbend loss (i.e., an increase in attenuation from the unbent state) at 1550 nm (WMCD at 1550 nm) which is less than or equal to 0.07 dB/km and in some embodiments less than or equal to 0.05 dB/km, such as for example 0.005 to 0.05 dB/km. The exemplary fibers disclosed herein are capable of exhibiting a basketweave microbend loss at −60° C. (i.e., an increase in attenuation from the unbent state) at 1550 nm which is less than or equal to 0.05 dB/km, in some embodiments less than or equal to 0.02 dB/km, and in some embodiments less than or equal to 0.01 dB/km such as for example 0.001 to 0.01 dB/km, and in some embodiments between 0.001 to 0.05 dB/km. The exemplary fibers disclosed herein are capable of exhibiting a basketweave microbend loss at −60° C. (i.e., an increase in attenuation from the unbent state) at 1625 nm which is less than or equal to 0.1 dB/km, in some embodiments less than or equal to 0.05 dB/km, in some embodiments less than or equal to 0.02 dB/km, in some embodiments less than or equal to 0.01 dB/km, and in some embodiments between 0.001 to 0.05 dB/km.

The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which is hereby incorporated by reference.

Various exemplary embodiments will be further clarified by the following examples. It will be apparent to those skilled in the art that various modifications and variations can be made without departing from the spirit or scope of the claims.

Table 1, below, list characteristics of illustrative modeled fiber examples A-D having a refractive index similar to those shown in FIGS. 3 and 4. In particular, set forth below or equal to 0.02 dB/km, and in some embodiments less than or equal to 0.01 dB/km such as for example 0.001 to 0.01 dB/km.

The specific fiber examples of Table 1 have the first cladding region (2) that are made of pure silica, and the cladding region 3 (i.e., the outer cladding) is silica updoped with greater than 1.2 wt % chlorine (Cl).

TABLE 1

| Parameter | Example A | Example B | Example C | Example D |
|---|---|---|---|---|
| Core's relative refractive index, Δ1 (%) | 0.48 | 0.46 | 0.49 | 0.5 |
| Core radius, r1 (micron) | 6.91 | 6.6 | 6.6 | 6.7 |
| Core Alpha | 2 | 2 | 2 | 2 |
| Inner cladding radius, r2 (micron) | 21 | 21.6 | 19 | 19 |
| Core/inner cladding radius ratio, r1/r2 | 0.33 | 0.3 | 0.35 | 0.35 |
| Inner cladding's relative refractive index, Δ2 (%) | 0 | 0 | 0 | 0 |
| Region 3 relative refractive index (outer cladding), Δ3 (%) | 0.15 | 0.13 | 0.18 | 0.2 |
| Outer fiber radius, Rmax (microns) | 62.5 | 62.5 | 62.5 | 62.5 |
| Cl concentration in region 3, wt % | 1.5 wt % | 1.3 | 1.8 | 2 |
| Inner cladding (trench) volume, V2 (% micron$^2$) | 59.4 | 55.16 | 57.14 | 63.22 |
| Zero dispersion wavelength (nm) | 1303 | 1308.3 | 1304.9 | 1303 |
| Dispersion at 1310 nm (ps/nm/km) | 1.37 | 0.881 | 1.19 | 1.36 |
| Dispersion Slope at 1310 nm (ps/nm$^2$/km) | 0.0913 | 0.0904 | 0.0906 | 0.091 |
| Dispersion 1550 nm (ps/nm/km) | 19.17 | 18.63 | 18.83 | 19.04 |
| Dispersion Slope 1550 nm (ps/nm$^2$/km) | 0.062 | 0.061 | 0.061 | 0.061 |
| MFD at 1310 nm (micron) | 9.2 | 9.13 | 9.01 | 9.01 |
| MFD at 1550 nm (micron) | 10.28 | 10.28 | 10.06 | 10.04 |
| LLWM at 1550 nm, dB/m | 0.94 | 1.08 | 1.64 | 1.77 |
| Pin Array at 1550 nm, dB | 37.63 | 46.66 | 103.9 | 123 |
| Cable Cutoff (nm) | 1217 | 1252.45 | 1242.99 | 1259 |
| MAC # (1310 nm MFD/CableCutoff (μm)) | 7.56 | 7.29 | 7.25 | 7.16 |
| Attenuation at 1550 nm (dB/km) | <0.18 | <0.18 | <0.18 | <0.18 |
| Attenuation at 1310 nm (dB/km) | <0.32 | <0.32 | <0.32 | <0.32 |
| 10 mm diameter bend loss, at 1550 nm, (dB/turn) | 0.82 | 0.4 | 0.57 | 0.45 |
| 15 mm diameter bend loss, at 1550 nm, (dB/turn) | 0.22 | 0.097 | 0.147 | 0.12 |
| 20 mm diameter bend loss, at 1550 nm, (dB/turn) | 0.06 | 0.024 | 0.038 | 0.032 |
| 30 mm diameter bend loss, at 1550 nm, (dB/turn) | 0./012 | 0.003 | 0.006 | 0.007 | for each example is the relative refractive index $\Delta_1$, core alpha, and outer radius $r_1$ of the central core (1), relative refractive index $\Delta_2$ and outer radius $r_2$ of the first cladding region (2) and profile volume $V_2$ of the first cladding region (2), which is calculated between $r_1$ and $r_2$, as well as the relative refractive index $\Delta_3$. Also set forth are chromatic dispersion and dispersion slope at 1310 nm, chromatic dispersion and dispersion slope at 1550 nm, mode field diameter at 1310 nm and 1550 nm, lateral load wire mesh microbend at 1550 nm, pin array macrobend at 1550 nm, zero dispersion wavelength, 22 m cable cutoff, MAC number at 1310 nm, and, spectral attenuation at 1310 and 1550 nm, and macro bend induced losses (dB/turn) calculated at 1550 nm wavelength when the bend diameter is 10 mm, 15 mm, 20 mm and 30 mm, respectively. In the embodiments of Table 1, the optical fibers exhibits a basketweave microbend loss at −60° C. at 1550 nm which is less than or equal to 0.05 dB/km, for example less than or equal to 0.03 dB/km. The exemplary fibers disclosed herein are capable of exhibiting a wire mesh covered drum microbend loss (i.e., an increase in attenuation from the unbent state) at 1550 nm (WMCD at 1550 nm) which is less than or equal to 0.07 dB/km and in some embodiments less than or equal to 0.05 dB/km, such as for example 0.005 to 0.05 dB/km. The exemplary fibers disclosed herein are capable of exhibiting a basketweave microbend loss at −60° C. (i.e., an increase in attenuation from the unbent state) at 1550 nm which is less than or equal to 0.05 dB/km, in some embodiments less than Table 2 below lists characteristics of actual manufactured illustrative fiber example E. This fiber also has a primary coating applied thereto having a Young's modulus of about 0.9 MPa and a secondary coating having a Young's modulus of about 1200 MPa, and has the refractive index profile as shown in FIG. 5. The manufactured fiber corresponding to example E fiber of Table 2 was drawn from optical preforms on a draw furnace. In particular, set forth below for each example is the relative refractive index percent $\Delta_1$, core alpha and outer radius $r_1$ of the central core region (1), relative refractive index percent $\Delta_2$ and outer radius $r_2$ of the inner cladding region (2); refractive index profile volume $V_2$ of the inner cladding region (2), which is calculated between $r_1$ and $r_2$; and relative refractive index percent $\Delta_3$. Also set forth are chromatic dispersion and dispersion slope at 1310 nm, chromatic dispersion and dispersion slope at 1550 nm, mode field diameter at 1310 nm and 1550 nm, lateral load wire mesh microbend at 1550 nm, wire mesh covered drum microbend test at 1550 nm, pin array macrobend at 1550 nm, zero dispersion wavelength, 22 m cable cutoff, MAC number at 1310 nm, 1×20 mm diameter bend loss, spectral attenuation at 1310 and 1550 nm, and macro bend induced losses at 1550 nm wavelength when the bend diameter is 10 mm, 15 mm, 20 mm and 30 mm. In this embodiment the first cladding region was made of silica and the second cladding region was made of silica doped with 1.3 wt % Cl.

TABLE 2

| Parameter | Example E fiber |
|---|---|
| $\Delta 1$ (%) | 0.47% |
| r1 (micron) | 7.5 |
| Core Alpha | 2 |
| r2 (micron) | 20.5 |
| r1/r2 | 0.37 |
| $\Delta 2$ (%) | 0 |
| $\Delta 3$ (%) | 0.13 |
| V2 (% micron$^2$) | 47.3 |
| Dispersion 1310 nm (ps/nm/km) | 0.1232 |
| Dispersion Slope 1310 nm (ps/nm$^2$/km) | 0.0904 |
| Dispersion 1550 nm (ps/nm/km) | 17.76 |
| Dispersion Slope 1550 nm (ps/nm$^2$/km) | 0.061 |
| MFD 1310 nm (micron) | 9.18 |
| MFD 1550 nm (micron) | 10.16 |
| Lambda 0 (nm) | 1308.6 |
| Cable Cutoff (nm) | 1208 |
| MAC # (1310 nm MFD/CabCutoff) | 7.6 |
| 1 × 10 mm bend loss at 1550 nm (dB/turn) | 0.8 |
| 1 × 15 mm bend loss at 1550 nm (dB/turn) | 0.104 |
| 1 × 20 mm bend loss at 1550 nm (dB/turn) | 0.1 |
| 1 × 30 mm bend loss at 1550 nm (dB/turn) | 0.017 |
| Microbend loss at 1550 nm in Basket-weave test at −60 C. for 242 microns coating diameter (dB/km) | 0.005 |
| Microbend loss at 1625 nm in Basket-weave test at −60 C. for 242 microns coating diameter (dB/km) | 0.005 |
| Microbend loss at 1550 nm in Basket-weave test at −60 C. for 200 microns coating diameter (dB/km) | 0.03 |
| Microbend loss at 1625 nm in Basket-weave test at −60 C. for 200 microns coating diameter (dB/km) | 0.03 |

FIG. 5 shows a measured refractive index profile of the manufactured optical fiber corresponding to Table 2. In the profile of the exemplary embodiment shown in FIG. 5, the core region (1) which comprises $\Delta_1$ is surrounded by depressed cladding inner cladding region (2) comprising $\Delta_2$. Inner cladding region (2) s surrounded by the second (outer) cladding region (3) comprising $\Delta_3$ which is raised—i.e., higher than $\Delta_2$. The difference between $\Delta_3$ and $\Delta_2$ is greater than 0.12% and the fiber exhibits a MAC number>6.5. In the embodiment illustrated in FIG. 5, the first cladding region (2) is substantially undoped silica and the second cladding region (3) is silica doped with chlorine. The optical fiber disclosed in Table 2 has cladding (2') that has an outer diameter of about 125 micron.

As can be seen in example E fiber of Table 2 above, exemplary fiber embodiments employ a central glass core region having index $\Delta_1$, a first inner cladding region having index $\Delta_2$, and an outer cladding region having index $\Delta_3$; wherein $\Delta_1>\Delta_3>\Delta_2$, wherein the difference between $\Delta_3$ and $\Delta_2$ is greater than or equal to 0.12%. Such exemplary fiber embodiments exhibit a cable cutoff less than or equal to 1260 nm and a bend loss at 1550 nm of less than 0.5 dB/turn when wound upon on a 15 mm diameter mandrel. These exemplary fiber embodiments also exhibit a mode field diameter between about 9 microns and 9.5 microns at 1310 nm, a zero dispersion wavelength between 1300 and 1324 nm, a dispersion slope at 1310 nm which is less than or equal to 0.092 ps/nm$^2$/km) These exemplary fiber embodiments exhibit a Wire Mesh Covered Drum (WMCD) bend loss at 1550 nm which is less than or equal to 0.07 dB/km, more preferably less than or equal to 0.06 dB/km, and in some embodiments less than or equal to 0.05 dB/km. These exemplary fiber embodiments also exhibit a pin array bend loss at 1550 nm which is less than 8.5 dB, more preferably less than 7 dB. These fibers exhibit a Basketweave microbend loss at 1550 nm which is less than or equal to 0.05 dB/km, in some embodiments less than or equal to 0.025 dB/km, and in some embodiments less than or equal to 0.01 dB/km.

In some embodiments, the fibers exhibit a bend loss at 1550 nm, when wound upon on a 15 mm diameter mandrel, of less than 0.5 dB/turn. These fibers also exhibit a bend loss at 1550 nm, when wound upon on a 20 mm diameter mandrel, of less than 0.1 dB/turn, more preferably less than 0.075 dB/turn, and in some fiber embodiments less than 0.05 dB/turn. These fiber embodiments also exhibit a bend loss at 1550 nm, when wound upon on a 30 mm diameter mandrel, of less than 0.025 dB/turn, and in some embodiments of less than 0.003 dB/turn. Some of these examples employ chlorine in the second outer cladding region 3 in an amount greater than 12000 ppm (1.2 wt %), for example between 12000 ppm and 25000 ppm. Some of these examples employ chlorine in the outer cladding region in an amount greater than or equal to 13000 ppm. Some of these examples employ chlorine in the outer cladding region in an amount greater than 13000 ppm and less than 30000 ppm by weight.

Fiber attenuation at 1550 nm is preferably less than 0.20 dB/km, more preferably less than 0.19 dB/km, even more preferably less than 0.18 dB/km. In some preferred embodiments the attenuation at 1550 nm is less than or equal to 0.191 dB/km, even more preferably less than or equal to 0.188 dB/km, even more preferably less than or equal to 0.185 dB/km, even more preferably less than or equal to 0.182 dB/km, and most preferably less than or equal to 0.180 dB/km.

In some embodiments (see, for example, FIG. 6) the second cladding region (3) is in turn surrounded by a third cladding region (4) comprising $\Delta_4$. In some embodiments cladding region (4) may comprise silica that is substantially undoped with Ge or Cl (i.e., the relative refractive index percent of the third cladding region (4) is smaller than that of the second region (3) (i.e., $\Delta_4<\Delta_3$). For example, $\Delta_4$ may be not greater than 0.002% relative to that of pure silica. In some embodiments the third cladding region (4) may be essentially comprised of silica. In some embodiments, the third cladding region (4) has viscosity that is larger than the viscosity of the second cladding region (4) by 0.1×10$^7$ Poise at 1650° C. In still other embodiments, the outer cladding region (4) has viscosity that is larger than the viscosity of the second cladding region (3) by 0.1×10$^8$ Poise, at 1650° C. In yet other embodiments, region (4) of the outer cladding has viscosity that is larger than the viscosity of region (3) by 0.1×10$^9$ Poise at 1650° C. In some embodiments, the third cladding region (4) starts at a radial location larger than 40 microns. In some other embodiments, the third cladding region (4) starts at a radial location larger than 45 microns. In still other embodiments, the third cladding region (4) starts at a radial location larger than 50 microns. Table 3, below, list characteristics of illustrative modeled fiber examples F-G having a refractive index profile similar to that shown in FIG. 6 and having the third cladding region (4) with viscosity higher than that of the second cladding region (3).

TABLE 3

| Parameter | Example F | Example G |
|---|---|---|
| Core's relative refractive index, $\Delta 1$ (%) | 0.48 | 0.5 |
| Core radius, r1 (micron) | 6.91 | 6.7 |
| Core Alpha | 2 | 2 |

TABLE 3-continued

| Parameter | Example F | Example G |
|---|---|---|
| Inner cladding radius, r2 (micron) | 21 | 19 |
| Core/inner cladding radius ratio, r1/r2 | 0.33 | 0.35 |
| Inner cladding relative refractive index, Δ2 (%) | 0 | 0 |
| Region 3 relative refractive index (outer cladding), Δ3 (%) | 0.15 | 0.2 |
| Cl concentration in region 3, wt % | 1.5 | 2 |
| Inner cladding (trench) volume, V2 (% micron$^2$) | 59.4 | 63.22 |
| Radius of second inner cladding, R3 (microns) | 45 | 50 |
| Index of third cladding region 4, Δ4 (%) | 0 | 0 |
| Chlorine in third cladding region 4 | 0 | 0 |
| Viscosity difference between cladding regions 3 and region 4 (Poise) at 1650° C. | 9.6 × 10$^6$ | 1.24 × 10$^7$ |
| Outer fiber radius, Rmax (microns) | 62.5 | 62.5 |
| Zero dispersion wavelength (nm) | 1303 | 1303 |
| Dispersion at 1310 nm (ps/nm/km) | 1.37 | 1.36 |
| Dispersion Slope at 1310 nm (ps/nm$^2$/km) | 0.0913 | 0.091 |
| Dispersion 1550 nm (ps/nm/km) | 19.17 | 19.04 |
| Dispersion Slope 1550 nm (ps/nm$^2$/km) | 0.062 | 0.061 |
| MFD at 1310 nm (micron) | 9.2 | 9.01 |
| MFD at 1550 nm (micron) | 10.28 | 10.04 |
| LLWM at 1550 nm, dB/m | 0.94 | 1.77 |
| Pin Array at 1550 nm, dB | 37.63 | 123 |
| Cable Cutoff (nm) | 1217 | 1259 |
| MAC # (1310 nm MFD/CableCutoff (μm)) | 7.56 | 7.16 |
| Attenuation at 1550 nm (dB/km) | <0.18 | <0.18 |
| Attenuation at 1310 nm (dB/km) | <0.32 | <0.32 |
| 10 mm diameter bend loss, at 1550 nm, (dB/turn) | 0.82 | 0.45 |
| 15 mm diameter bend loss, at 1550 nm, (dB/turn) | 0.22 | 0.12 |
| 20 mm diameter bend loss, at 1550 nm, (dB/turn) | 0.06 | 0.032 |
| 30 mm diameter bend loss, at 1550 nm, (dB/turn) | 0./012 | 0.007 |

In the embodiments of Table 3, the optical fibers exhibits a basketweave microbend loss at −60° C. at 1550 nm which is less than or equal to 0.05 dB/km, for example less than or equal to 0.03 dB/km.

The optical fibers (10) disclosed herein may be surrounded by a protective coating, e.g., a primary coating P contacting and surrounding the outer cladding region (3) (or region (4), if the fiber contains cladding region (4) surrounding the annular region (3)), the primary coating P having a Young's modulus of less than 1.0 MPa, preferably less than 0.9 MPa, and in some embodiments not more than 0.8 MPa, and in some embodiments not more than 0.5 MPa, and in some embodiments not more than 0.3 MPa, for example 0.1 to 1 MPa, and in some embodiments 0.1 to 0.5 MPa; and further comprises a secondary coating S contacting and surrounding the primary coating P, the secondary coating S having a Young's modulus of greater than 1200 MPa, and in some embodiments greater than 1400 MPa, for example at least 1500 MPa, or at least 1600 MPa, at least 1800 MPa, or 1400 MPa to 2500 MPa or 1500 MPa to 2500 MPa. The lower modulus of the primary coating (e.g. <0.5 MPa) supports good microbend performance, and higher modulus secondary coating (e.g., >1500 MPa) supports improve puncture resistance of the secondary coating, even when its thickness is reduced. According to some embodiments the outer diameter of the secondary coating S is not greater than 250 microns, for example not greater than 242 microns (e.g., ≤225 microns, ≤210 microns, or ≤200 microns), for example 175-242 microns, or 175 to 225 microns, or 180 to 200 microns. The above fiber designs enable good micro and macro bending performance even with coating diameters of less than 225 microns, which enables smaller diameter, lower cost, higher fiber density cables with excellent optical performance.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 micron) and 0.004" (102 micron) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
   (i) a central core region having outer radius $r_1$ and refractive index $\Delta_1$;
   (ii) a cladding surrounding the central core region, the cladding comprising:
      (a) a first cladding region having an outer radius 25 microns>$r_2$>16 microns and relative refractive index $\Delta_2$, the ratio of $r_1/r_2$ is larger than 0.24;
      (b) a second cladding region surrounding the first cladding region and having a relative refractive index $\Delta_3$ and an outer radius $r_3$, wherein the second cladding region comprises at least 1.25 wt % chlorine (Cl), and wherein $\Delta_1>\Delta_3>\Delta_2$, and wherein the difference between $\Delta_3$ and $\Delta_2$ is greater than 0.12%, and $\Delta_3>0.12\%$;
      (c) said second cladding region surrounded by primary coating P and secondary coating S that surrounds the primary coating, wherein the outer diameter of the secondary coating S is ≤210 microns; and
      (d) said fiber exhibits a mode field diameter MFD>9 microns at a 1310 nm wavelength; and bend loss at 1550 nm for a 15 mm diameter mandrel of less than 0.5 dB/turn.

2. The optical fiber of claim 1, wherein the outer diameter of secondary coating S is ≤200 microns.

3. The optical fiber of claim 1, wherein the Young's modulus of the primary coating P is less than 1 MPa.

4. The optical fiber of claim 1, wherein the Young's modulus of the primary coating P is less than 0.8 MPa.

5. The optical fiber of claim 1, wherein the Young's modulus of the primary coating P is less than 0.5 MPa.

6. The optical fiber of claim 1, wherein the Young's modulus of the secondary coating S is greater than 1200 MPa.

7. The optical fiber of claim 1, wherein the Young's modulus of the secondary coating S is greater than 1500 MPa.

8. The optical fiber of claim 1, wherein said fiber exhibits a 22 m cable cutoff less than or equal to 1260 nm.

9. The optical fiber of claim 1, wherein the central core region of said fiber exhibits an alpha less than 10.

10. The optical fiber of claim 1, said fiber further exhibiting a wire mesh covered drum microbend loss at 1550 nm which is less than or equal to 0.07 dB/km.

11. The optical fiber of claim 1, wherein the first cladding region contains less than 0.02 wt % fluorine.

12. The optical fiber of claim 1, wherein the first cladding region is essentially free of fluorine and germania.

13. The optical fiber of claim 1, wherein the volume of the first cladding region is |V2|>30% Δ micron².

14. The fiber of claim 1, wherein the optical fiber exhibits:
MFD at 1310 nm>9 microns;
cable cutoff wavelength<1260 nm;
zero dispersion wavelength<1324 nm;
bend loss at 10 mm diameter<1.5 dB/turn;
bend loss at 15 mm diameter<0.5 dB/turn
wherein the bend loss is macrobend loss and is measured at 1550 nm wavelength.

15. The optical fiber of claim 1, wherein the volume of the first cladding region is |V2|>60% Δ micron².

16. An optical fiber comprising:
(i) a central core region having outer radius $r_1$ and refractive index $\Delta_1$
(ii) a cladding surrounding the central core region, the cladding comprising:
  (a) a first cladding region having an outer radius 25 microns>$r_2$>16 microns and relative refractive index $\Delta_2$, wherein the ratio of $r_1/r_2$ is larger than 0.24,
  (b) a second cladding region surrounding the first cladding region and having a relative refractive index $\Delta_3$ and an outer radius r3, wherein the second cladding region comprises at least 1.2 wt % chlorine (Cl), and wherein $\Delta_1>\Delta_3>\Delta_2$, and wherein the difference between $\Delta_3$ and $\Delta_2$ is greater than 0.12%, and $\Delta_3>0.12\%$;
  (c) said second cladding region being surrounded by primary coating P, and secondary coating S surrounding the primary coating P, said secondary coating S having the outer diameter of <210 microns;
  (d) and said fiber exhibits a mode field diameter MFD>9 microns at a 1310 nm wavelength; and bend loss at 1550 nm for a 15 mm diameter mandrel of less than 0.5 dB/turn;
further comprising a third cladding region surrounding the second cladding region, the third region having a refractive index $\Delta_4$, wherein $\Delta_3>\Delta_4$, and wherein the difference between $\Delta_3$ and $\Delta_4$ is greater than 0.1%, and $-0.02<\Delta_4<0.02$.

17. The optical fiber of claim 16, wherein the outer diameter of secondary coating is ≤200 microns.

18. The optical fiber of claim 16, wherein the Young's modulus of primary coating P is less than 1 MPa.

19. The optical fiber of claim 16, wherein the Young's modulus of primary coating P is less than 0.8 MPa.

20. The optical fiber of claim 16, wherein the Young's modulus of primary coating P is less than 0.5 MPa.

21. The optical fiber of claim 16, wherein the Young's modulus of secondary coating S is greater than 1200 MPa.

22. The optical fiber of claim 16, wherein the Young's modulus of secondary coating S is greater than 1500 MPa.

23. The optical fiber of claim 16, wherein the third cladding region includes less chlorine than the second cladding region, or no chlorine.

24. The optical fiber of claim 16, wherein the central core region of said fiber exhibits an alpha greater than or equal to 0.5 and less than or equal to 10.

25. The optical fiber comprising:
(i) a central core region having outer radius $r_1$ and refractive index $\Delta_1$
(ii) a cladding surrounding the central core region, the cladding comprising:
  (a) a first cladding region having an outer radius 25 microns>$r_2$>16 microns and relative refractive index $\Delta_2$, wherein the ratio of $r_1/r_2$ is larger than 0.24 and
  (b) a second cladding region surrounding the first cladding region and having a relative refractive index $\Delta_3$ and an outer radius $r_3$, wherein the second cladding region comprises at least 1.25 wt % chlorine (Cl), and wherein $\Delta_1>\Delta_3>\Delta_2$, and wherein the difference between $\Delta_3$ and $\Delta_2$ is greater than 0.12%, and $\Delta_3>0.12\%$;
  (c) said second cladding region being surrounded by primary coating P and secondary coating S that surrounds the primary coating, wherein the outer diameter of the secondary coating S is ≤210 microns;
and said fiber exhibits a mode field diameter MFD>9 microns at a 1310 nm wavelength; and bend loss at 1550 nm for a 15 mm diameter mandrel of less than 0.5 dB/turn, said fiber having a coating thereon and exhibiting a basketweave microbend loss at −60° C. at 1550 nm which is less than or equal to 0.05 dB/km.

26. The optical fiber of claim 25, wherein the outer diameter of secondary coating S is ≤200 microns.

27. The optical fiber of claim 25, wherein the Young's modulus of primary coating P is less than 1 MPa.

28. The optical fiber of claim 25, wherein the Young's modulus of primary coating P is less than 0.5 MPa.

29. The optical fiber of claim 25, wherein the Young's modulus of secondary coating S is greater than 1200 MPa.

30. The optical fiber of claim 25, wherein the Young's modulus of secondary coating S is greater than 1500 MPa.

31. The optical fiber of claim 25, said fiber further exhibiting a basketweave microbend loss at −60° C. at 1550 nm which is less than or equal to 0.01 dB/km.

32. The optical fiber of claim 25, said fiber further exhibiting a basketweave microbend loss at −60° C. at 1625 nm which is less than or equal to 0.05 dB/km.

33. The optical fiber of claim 25, said fiber further exhibiting a basketweave microbend loss at −60° C. at 1625 nm which is less than or equal to 0.01 dB/km.

34. The optical fiber of claim 25, wherein the second cladding region comprises at least 1.3 wt % chlorine (Cl).

* * * * *

UNITED STATES PATENT AND TRADEMARK OFFICE
CERTIFICATE OF CORRECTION

PATENT NO. : 10,274,674 B2  
APPLICATION NO. : 16/034690  
DATED : April 30, 2019  
INVENTOR(S) : Dana Craig Bookbinder et al.

Page 1 of 1

It is certified that error appears in the above-identified patent and that said Letters Patent is hereby corrected as shown below:

On the Title Page

In Column 1, item (71), Applicant, Line 1, delete "Incorpoated," and insert -- Incorporated, --, therefor.

In the Claims

In Column 17, Line 12 approx., Claim 14, delete "The fiber" and insert -- The optical fiber --, therefor.

Signed and Sealed this  
Twenty-fifth Day of February, 2020

Andrei Iancu  
*Director of the United States Patent and Trademark Office*